United States Patent [19]
Le Garrec

[11] Patent Number: 5,175,553
[45] Date of Patent: Dec. 29, 1992

[54] TELEMETRIC PROCESS FOR MEASURING SHORT DISTANCES

[75] Inventor: Guy Le Garrec, Sannois, France

[73] Assignee: Societe Nationale d'Etude et de Construction de Moteurs d'Aviation "S.N.E.C.M.A.", Paris, France

[21] Appl. No.: 758,584

[22] Filed: Sep. 12, 1991

[30] Foreign Application Priority Data

Sep. 18, 1990 [FR] France .................... 90 11482

[51] Int. Cl.$^5$ ............................................. G01S 13/32
[52] U.S. Cl. ....................................... 342/85; 342/98; 342/135; 342/145
[58] Field of Search ................. 342/82, 85, 98, 135, 342/145

[56] References Cited

U.S. PATENT DOCUMENTS

| | | |
|---|---|---|
| 3,216,010 | 11/1965 | Roeschke ........................ 342/85 |
| 3,614,785 | 10/1971 | Kratzer . |
| 3,882,494 | 5/1975 | Bolger . |
| 4,014,021 | 3/1977 | Fournier et al. . |
| 4,053,888 | 10/1977 | Robin et al. . |
| 4,078,234 | 3/1978 | Fishbein et al. ............ 342/145 X |
| 4,396,916 | 8/1983 | Schnerk . |

FOREIGN PATENT DOCUMENTS 2580080  10/1986  France .

Primary Examiner—T. H. Tubbesing
Attorney, Agent, or Firm—Oblon, Spivak, McClelland, Maier & Neustadt

[57] ABSTRACT

A telemetric process for measuring short distances comprises emitting an electromagnetic signal modulated by a pseudo-random sequence having a number (n) of bits delivered at a clock frequency (fH), correlating the echo detected with the modulated signal time-delayed by known means, and varying the clock frequency, as a function of the correlation measurement, within an operational field divided into a plurality of operating ranges, the number of bits inthe pseudo-random sequence being modified accoridng to the operating range of the clock frequency. The process is particlualry useful for proximity measurement close to a reflecting surface.

6 Claims, 2 Drawing Sheets

TELEMETRIC PROCESS FOR MEASURING SHORT DISTANCES

BACKGROUND OF THE INVENTION

1. Field of the Invention

The present invention relates to a telemetric process for measuring short distances, and is particularly applicable to continuous emission proximity radars which make use of correlative devices using binary logic sequences.

2. Summary of the Prior Art

A proximeter or telemetric radar for measuring short distances fitted to a flying machine enables the shortest distance between it and another flying machine to be measured. French Patents Nos. 2 286 391 and 2 580 080 describes examples of such proximeters, and an example is shown in FIG. 3, which operate briefly as follows.

As shown in FIG. 3, radar frequency generator 1 generates a microwave signal in the range generally used for radar, i.e., in the vicinity of 2 GHz. This signal is fed to an antenna 5 successively through an isolator 2, a phase modulator 3 and a duplexer 4. Isolator 2 separates radar frequency generator 1 from phase modulator 3 to avoid frequency drifts which could occur as a result of a mismatch. Phase modulator 3 provides a modulation, by a phase shift known as O-II, of the signals S1 or S2 coming from the switching threshold generator 32 through pseudo-random sequence generator 50. Duplexer 4 alternately provides a connection, of a transmission through phase modulator 3 with antenna 5, and of a reception of antenna 5 with the received signals being input into correlators 22, 24. This duplexer 4 can be of the ferrite circular type.

The received signals at antenna 5 are directed by duplexer 4 to correlators 22 and 24, where the received signals are respectively correlated with a signal identical to the transmitted modulation signal but delayed by a time $T_1$ and $T_1 + \Delta t$ by shift register 30. These correlation functions and the role of comparator 26 are in particular explained in U.S. Pat. No. 4,014,021. Clock 28 controls pseudo-random sequence generator 50, and is in turn controlled by a signal output from comparator 26. Consequently, the measured distance can be deduced from clock frequency FH. This is the role of converter 19.

A continuous electromagnetic signal is modulated by a pseudo-random sequence comprising a certain number of bits generated by a feed-back shift register and delivered at a clock frequency. The modulated signal is emitted by a transmitting antenna, and the reflected signal (or echo) is detected by a receiving antenna and correlated with the modulated signal, time-delayed in a known manner. When the delay corresponds exactly to the outward and return journey of the emitted wave, for example after reflection from a target, the correlation function is at a maximum. The error voltage at the output of the correlator controls the clock frequency, which increases Progressively as the detected machine gets closer. In this way, the radar calculates from the clock frequency the distance to be measured.

It is known that this type of radar only operates within distances ranging from around 30 meters to about 2 meters. When no echo is detected, the clock frequency remains unchanged and corresponds to the predetermined distance limit, but as soon as a moving object enters the detection zone, the frequency "locks" onto the variation in distance by means of the correlation signal produced.

One can show that with such prior art proximeters, for this range of measurable distances, the machine carrying the radar must be about 300 m away from all parasitic reflecting surfaces, such as the ground.

Indeed, the periodicity of the pseudo-random sequence gives rise to a periodicity of the correlation function used for controlling the clock frequency. This periodicity involves the existence of an ambiguous distance at which one cannot distinguish between an echo reflected back from a nearby object and one situated beyond this ambiguous distance.

In general, for a sequence of n bits, the period of the correlation function is equal to $(2^n - 1)T$, namely 127 T if n equals 7, and where T is the period corresponding to the clock frequency. The period $(2^n - 1)T$ corresponds to the ambiguous distance. Now, T reduces (or, alternatively, the clock frequency increases) as the measured distance decreases, because the one is tied to the other by the correlation. Thus, the ambiguous distance reduces as the detected device approaches, which can upset the measuring process by making it imprecise.

Furthermore, various spurious signals can impair the detected signal and cause an incorrect measurement. For example a parasitic echo returned by a surface (the ground, for example) very much larger than that of the device to be detected has a very large amplitude (which can be as much as $10^4$ times the amplitude of the echo from the device to be detected). Other interference can be caused by poor decorrelation between the transmitting and receiving antennae or by leakages at the output of the correlator.

Usually, in order to avoid having to take into account these sources of interference or permanent echos, the detection is effected in a frequency band ranging from 1 to 20 kHz, which corresponds to the frequency drift due to the expected Doppler effect for the devices to be detected. Centering the detection on the average Doppler frequency enables the signal to noise ratio of the measurement to be improved.

FIG. 1 of the drawings represents diagrammatically the shape of the frequency spectrum of a signal modulated by a sequence of n bits delivered at the clock frequency fH.

This spectrum has lines with a spacing of $fH/2^n - 1$, and for ease of representation, the number of lines shown has been reduced. The hatched zone represents the Doppler dispersion zone within which the detection is carried out. One can se that the clock frequency and the number of bits are chosen so that the first spectral line does not fall within the detection zone.

During detection, the spectral lines move apart from one another and the spectrum is widened.

It will be understood that with a fixed number of bits, filtering imposes a lower limit upon the clock frequency. The operational limitations of the clock frequency demand a considerable separation from parasitic surfaces for the range of distances to be measured (a separation of about 300 m for a range of around 30 meters).

SUMMARY OF THE INVENTION

It is an object of the present invention to enable detection in a range of distances of the order of some tens of meters while maintaining a sufficiently large ambiguous distance to allow measurements to be taken from a distance as close as twenty meters from the ground or any other parasitic surface.

To do this, the invention provides for altering the number of bits of the pseudo-random sequence in accordance with the distance to be measured. In other words, when a detected object passes a distance threshold as it gets nearer, the number of bits is increased in such a way as to increase the ambiguous distance and to keep this sufficiently large so that it does not interfere with the measurement. The number of bits is chosen as a function of the value of the clock frequency so as to avoid the first spectral line at the frequency of the emitted modulated signal entering the Doppler dispersion zone where the detection takes place.

More precisely, according to the present invention there is provided a telemetric process for measuring short distances which comprises emitting an electromagnetic signal modulated by a pseudo-random sequence composed of a number (n) of bits delivered at a clock frequency (fH) which is varied as a function of a measurement of the correlation between an echo of the emitted modulated signal and the modulated signal time-delayed in a known manner, the clock frequency (fH) corresponding to the distance to be measured, wherein the clock frequency fH varies over an operational field which is divided into a plurality of operating ranges, and the number (n) of bits of the pseudo-random sequence is modified as a function of changes in the operating range of the clock frequency.

An important advantage of the process stems from the fact that the variation in length of the pseudo-random sequence generates no disturbance in the servo-control by distance (or more precisely, the servo-control by frequency). Indeed, the gradients of the correlation curves are not altered by the variation in the number of bits.

Preferably, the number (n) of bits of the pseudo-random sequence is increased when passing from a lower to a higher operating range of the clock frequency.

Advantageously, the number of bits of the pseudo-random sequence is chosen so that the ratio $fH/2^n-1$ shall be greater than a fixed value, this value being chosen to be at least equal to the upper limit of the Doppler dispersion zone hatched in FIG. 1.

In one embodiment, the operational field may comprise at least two operating ranges separated by a frequency threshold corresponding to a distance of about 6 meters.

DESCRIPTION OF THE PREFERRED EMBODIMENT

Figure 2:
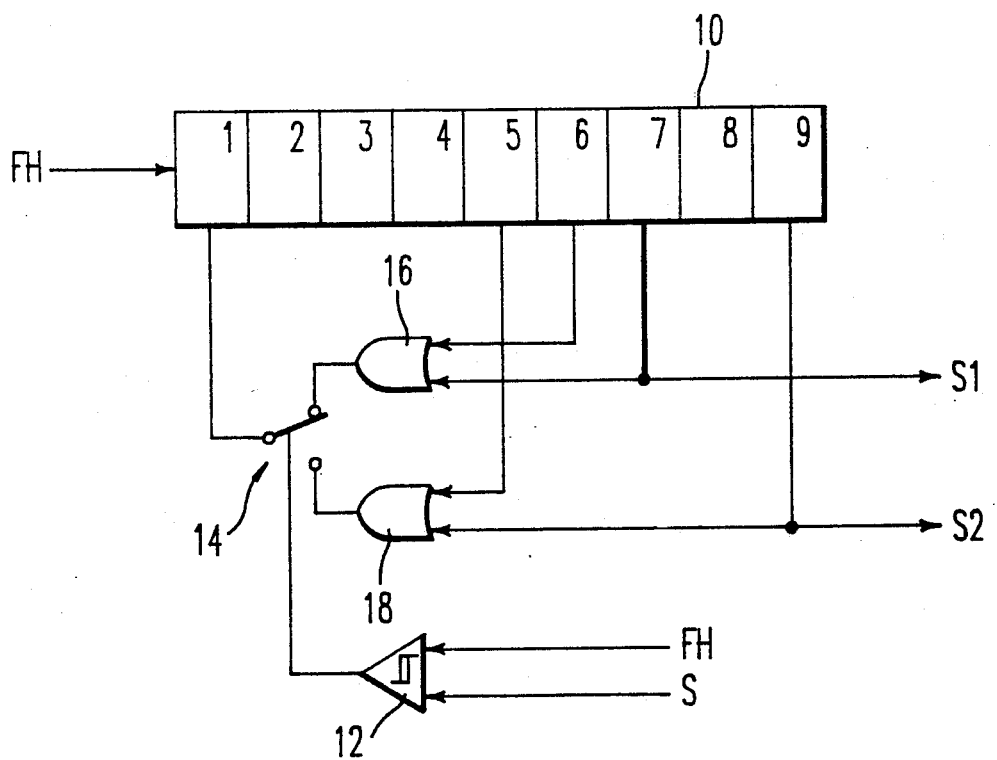
FIG. 2 represents diagrammatically one embodiment of a device for use in carrying out the process in accordance with the invention.
Figure 3:
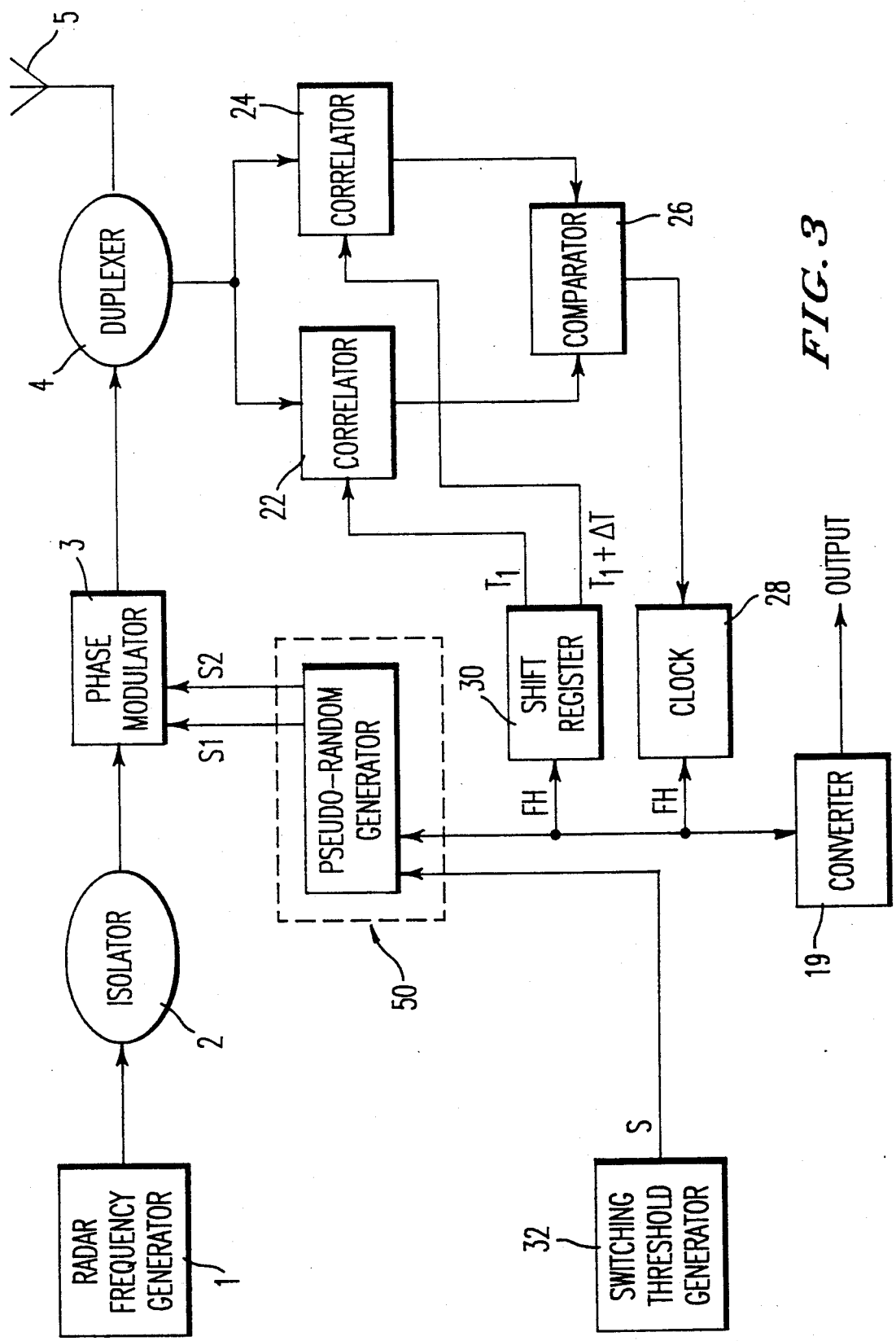
FIG. 3 represents an embodiment of a proximity radar.

Embodiments of proximeters of the same general type as may be used in carrying out the present invention are described in the French Patents Nos. 2 286 391 and 2 580 080 previously mentioned, and the disclosure thereof is incorporated herein by reference. The present invention is concerned with that part of the apparatus relating to the delivery of the pseudo-random sequence, that is, the pseudo-random generator of FIG. 3, for modulating the detection signal, and one embodiment is depicted in FIG. 2.

It will be remembered that the pseudo-random sequence is used to modulate a continuous signal which, on the one hand, is emitted by a transmitting antenna and, on the other hand, is delivered to the input of a correlating system after having been time-delayed in a known fashion. An echo of the modulated signal is detected by a receiving antenna and is correlated with the delayed modulated signal to generate an error voltage to control a clock (not shown in FIG. 2). The clock delivers a clock signal at a clock frequency fH representative of the distance between the machine carrying the proximeter and the object detected.

The pseudo-random sequence is generated by a feedback shift register 10 and controlled at the time base of the clock frequency fH. In the example shown in FIG. 2, the register 10 has nine stages numbered from 1 to 9. The system has two outputs S1 and S2 connected respectively to stages numbers 7 and 9 of the register 10. According to the value of the clock frequency fH (and therefore to the distance measured), one or other of these outputs is used.

The operational field of the proximeter, which extends, for example, from 20 to 2 m, is divided into two operating ranges separated by a threshold S situated, for example, at 6 m. A comparator 12 continuously compares the clock frequency with a frequency corresponding to the chosen threshold S, and delivers a control signal to a selector switch 14 which allows the number of bits of the sequence to be selected as a function of the operating range. For distances in the range extending from 20 to 6 m, the operative pseudo-random sequence has 7 bits while in the 6 to 2 m range, the operative pseudo-random sequence has nine bits.

The comparator 12 operates with a hysteresis cycle centered on the chosen threshold S so that, in the increasing direction, the switching takes place when the distance measured exceeds a distance slightly above 6 m and, in the decreasing direction, switching takes place when the distance measured is slightly below 6 m. In this way, repetitive switching is avoided when the measured distance is close to the threshold S.

OR logic gates 16 and 18 permit, for each selection, the formation of the pseudo-random sequence deduced from that delivered by the register 10. The "OR" gate 16 is, for example, connected so that its inputs receive the outputs from stages numbers 6 and 7 of the register 10, and the "OR" gate 18 is, for example, connected to receive as inputs the outputs of stages 5 and 9. According to the control signal applied, the selector switch 12 connects the output of one or other of the OR gates 16,18 to the input of stage number 1 of the shift register 10.

When the proximeter is in the waiting situation, the clock frequency fH is fixed and corresponds to the maximum measured distance, in this example 20 m. When a significant echo is detected, the clock frequency fH is dependent upon the measured distance and increases as this distance decreases.

Figure 1:
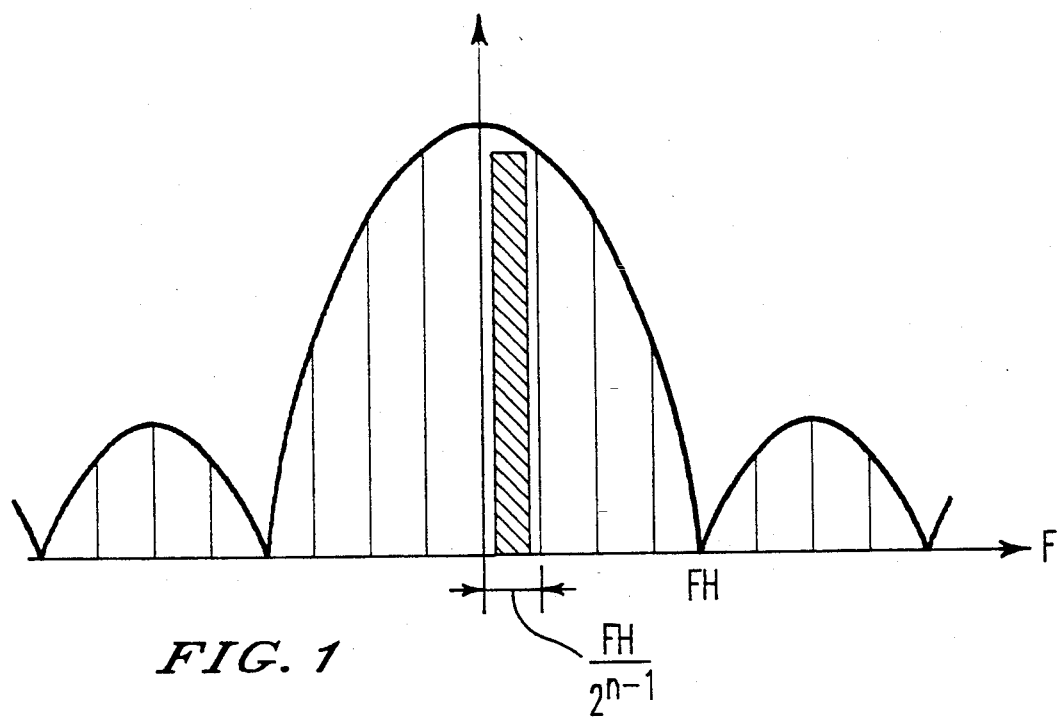
FIG. 1, as already described, represents diagrammatically a frequency spectrum of a continuous signal modulated by a pseudo-random sequence.

As long as the distance remains in the 20 to 6 m range, the number n of bits in the pseudo-random sequence is equal to 7. By referring to FIG. 1, it will be appreciated that the spectral lines of the emitted signal separate from each other and that the spectrum broadens.

When the distance measured crosses the fixed threshold S, the change of operating range brings about a change in the number n of bits in the pseudo-random sequence from 7 to 9. This allows the spectral lines of the emitted signal to be bunched closer together, and therefore keeps the ambiguous distance sufficiently far removed not to disturb the measurement. Moreover, the switching threshold and the number of bits in each range are such that the ratio $fH/2^n-1$ is never less than the upper limit of the Doppler dispersion zone, so as to maintain a maximum signal to noise ratio.

Of course, when the detected object moves away and crosses the distance threshold in the opposite direction, the pseudo-random sequence changes back from nine to seven bits.

As a result of the process in accordance with the invention, it is possible to maintain the ambiguous distance at a remote point and to preserve a maximum signal to noise ratio thus enabling proximity measurements to be carried out at a distance as low as twenty meters from a reflecting surface such as the ground.

The invention is in no way restricted to the particular embodiment which has been described and illustrated by way of example, but provides for any number of variants. Thus, other devices, using memory for example, may be used to put the process of the invention into practice. In addition, the number of operating ranges is not limited to two, and the number of bits chosen may differ from seven and nine. These figures depend on the application envisaged.

I claim:

1. In a telemetric process for measuring short distances comprising the steps of:
   generating an electromagnetic signal;
   generating a pseudo-random sequence composed of a number (n) of bits delivered at a clock frequency (fH);
   modulating said electromagnetic signal by said pseudo-random sequence;
   emitting said modulated electromagnetic signal and simultaneously time-delaying said modulated signal;
   receiving an echo of said emitted modulated signal;
   measuring the correlation between the echo of said emitted modulated signal and said time delayed modulated signal; and
   varying the clock frequency (fH) as a function of said measured correlation, said clock frequency corresponding to the distance to be measured;
   the improvement comprising varying said clock frequency over an operational field which is divided into a plurality of operating ranges, and modifying the number (n) of bits in said pseudo-random sequence as a function of changes in the operating range of said clock frequency, further comprising increasing the number of bits in said pseudo-random sequence when passing from a lower operating range to a higher operating range of said clock frequency.

2. A process in accordance with claim 1, further comprising choosing the number of bits in said pseudo-random sequence in such a way that the ratio $fH/2^n-1$ shall be greater than a fixed value.

3. A process in accordance with claim 1, wherein the step of varying the clock frequency over an operational field comprises varying the frequency over two operating ranges separated by a frequency threshold corresponding to a distance of about 6 m.

4. A telemetric apparatus for measuring short distances comprising:
   first generating means for generating an electromagnetic signal;
   second generating means for generating a pseudo-random sequence composed of a number n of bits delivered at a predetermined clock frequency fH;
   modulating means for modulating said electromagnetic signal by said pseudo-random sequence;
   emitting means for emitting said modulated electromagnetic signal and simultaneously time-delaying said modulated electromagnetic signal;
   receiving means for receiving an echo of said emitted modulated electromagnetic signal;
   measuring means for measuring the correlation between the echo of said emitted modulated electromagnetic signal and said time delayed modulated signal; and
   control means for varying the clock frequency fH as a function of said measured correlation, said clock frequency corresponding to the distance to be measured, said clock frequency varying over an operational field which is divided into a plurality of operating ranges;
   means for modifying the number n of bits in said pseudo-random sequence as a function of changes in the operating range of clock frequency; and
   wherein said modifying means comprises means for increasing the number of bits in said pseudo-random sequence when passing from a lower operating range to a higher operating range of said clock frequency.

5. The telemetric apparatus according to claim 4, wherein said second generating means comprises means for generating the number of bits in said pseudo-random sequence such that the ratio $fH/2^n-1$ is greater than a predetermined value.

6. The telemetric apparatus according to claim 4, wherein said control means comprises means for varying the clock frequency over two operating ranges separated by a frequency threshold corresponding to a distance of about 6 m.

* * * * *

UNITED STATES PATENT AND TRADEMARK OFFICE
CERTIFICATE OF CORRECTION

PATENT NO. : 5,175,553
DATED : December 29, 1992
INVENTOR(S) : GUY LE GARREC It is certified that error appears in the above-identified patent and that said Letters Patent is hereby corrected as shown below:

In the ABSTRACT, line 9, change "inthe" to --in the--.

Column 1, line 17, change "describes" to --describe--, line 46, change "FH" to --fH--, line 60, change "Progressively" to --progressively--.

Column 2, line 51, change "se" to --see--.

Column 6, line 39, insert --said-- after "of".

Signed and Sealed this

Thirtieth Day of November, 1993

Attest:

BRUCE LEHMAN

*Attesting Officer*  *Commissioner of Patents and Trademarks*